(12) United States Patent
Zhang et al.

(10) Patent No.: US 9,547,946 B2
(45) Date of Patent: Jan. 17, 2017

(54) VEHICLE UNIVERSAL CONTROL DEVICE FOR INTERFACING SENSORS AND CONTROLLERS

(75) Inventors: Qingshan Zhang, Shanghai (CN); Guoxia Zhang, Shanghai (CN); Zeng Yang, Shanghai (CN)

(73) Assignees: Harman International (China) Holdings Co., LTD., Shanghai (CN); Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 14/410,033

(22) PCT Filed: Jun. 29, 2012

(86) PCT No.: PCT/CN2012/077926
§ 371 (c)(1),
(2), (4) Date: Dec. 19, 2014

(87) PCT Pub. No.: WO2014/000275
PCT Pub. Date: Jan. 3, 2014

(65) Prior Publication Data
US 2015/0193991 A1  Jul. 9, 2015

(51) Int. Cl.
*G05B 19/042* (2006.01)
*G07C 5/02* (2006.01)
(Continued)

(52) U.S. Cl.
CPC ............ *G07C 5/02* (2013.01); *B60H 1/00657* (2013.01); *B60W 50/00* (2013.01); *G05B 19/042* (2013.01);
(Continued)

(58) Field of Classification Search
CPC ........... G07C 5/02; G07C 5/08; G05B 19/042; B60H 1/00657; B60W 50/00; B60W 2050/0001; B60W 2050/002
See application file for complete search history.

(56) References Cited

U.S. PATENT DOCUMENTS 6,889,097 B2 * 5/2005 Kiesel ................. G05B 19/042
700/18
7,272,476 B2 * 9/2007 Ortiz .................. B60R 16/0234
701/29.1
(Continued)

FOREIGN PATENT DOCUMENTS

CN      101249788 A    8/2008
CN      201816541 U    5/2011
(Continued)

OTHER PUBLICATIONS

ISA The State Intellectual Property Office of the People's Republic of China, International Search Report and Written Opinion of PCT/CN2012/077926, Apr. 4, 2013, 12 pages.

*Primary Examiner* — Russell Frejd
(74) *Attorney, Agent, or Firm* — Alleman Hall McCoy Russell & Tuttle LLP

(57) ABSTRACT

The present invention provides a universal control device for controlling sensors and controllers incorporated in a separate room. The universal control device includes a control logic analyzer adapted to receive a control logic, decompose the control logic into at least one condition and at least one instruction, and identify at least one sensor for the condition (s) and at least one controller for the instruction(s) correspondingly; a control center adapted to retrieve data from the at least one identified sensor, determine whether the at least one condition is met or not based on the retrieved data, and send the at least one instruction to the at least one identified controller for execution when the at least one condition is met; and a uniform interface adapted to couple the sensors and the controllers to the universal control
(Continued)

device, and implement communications between the universal control device and the sensors, and the controllers.

20 Claims, 4 Drawing Sheets

(51) Int. Cl.
    *G07C 5/08*     (2006.01)
    *B60H 1/00*     (2006.01)
    *B60W 50/00*     (2006.01)

(52) U.S. Cl.
    CPC ......... *G07C 5/08* (2013.01); *B60W 2050/0001* (2013.01); *B60W 2050/002* (2013.01)

(56) References Cited

U.S. PATENT DOCUMENTS

| | | | |
|---|---|---|---|
| 7,447,635 B1* | 11/2008 | Konopka | G10L 15/22 704/231 |
| 7,813,822 B1* | 10/2010 | Hoffberg | G06K 9/00369 381/73.1 |
| 7,904,187 B2* | 3/2011 | Hoffberg | G05B 15/02 370/200 |
| 7,966,078 B2* | 6/2011 | Hoffberg | G05B 15/02 370/200 |
| 8,209,093 B2 | 6/2012 | Hill | |
| 2005/0027539 A1* | 2/2005 | Weber | G08C 17/00 704/275 |
| 2006/0178792 A1* | 8/2006 | Ortiz | B60R 16/0234 701/29.1 |
| 2008/0202139 A1* | 8/2008 | Darroman | B60H 1/00742 62/244 |
| 2010/0057308 A1 | 3/2010 | Hill | |
| 2010/0141602 A1* | 6/2010 | Duchene | G05B 19/042 345/173 |
| 2010/0145485 A1* | 6/2010 | Duchene | G05B 19/042 700/90 |
| 2010/0146423 A1* | 6/2010 | Duchene | G05B 19/042 715/765 |
| 2010/0262313 A1* | 10/2010 | Chambers | G06Q 10/04 700/295 |
| 2011/0153034 A1* | 6/2011 | Philliben | G05B 23/0216 700/17 |
| 2012/0239173 A1* | 9/2012 | Laikari | A61B 5/1112 700/91 |
| 2013/0046398 A1* | 2/2013 | Hain | G05B 19/042 700/90 |

FOREIGN PATENT DOCUMENTS

| | | |
|---|---|---|
| CN | 102248941 A | 11/2011 |
| CN | 102294948 A | 12/2011 |

* cited by examiner

VEHICLE UNIVERSAL CONTROL DEVICE FOR INTERFACING SENSORS AND CONTROLLERS

CROSS REFERENCE TO RELATED APPLICATIONS

The present application is a U.S. National Phase of International Patent Application Serial No. PCT/CN2012/077926 entitled "VEHICLE UNIVERSAL CONTROL DEVICE FOR INTERFACING SENSORS AND CONTROLLERS," filed on Jun. 29, 2012, the entire contents of which are hereby incorporated by reference for all purposes.

TECHNICAL FIELD

The present application generally relates to a universal control device, in particular a universal control device configured to interface sensors and controllers for controlling various devices in a separate room, especially in a vehicle.

BACKGROUND

Nowadays, many sensors and controllers for controlling corresponding devices are incorporated in a separate room, such as vehicle, office room, and cinema etc., to make such a separate room sensitive to environment and comfortable. Sensors are used to monitor inside and outside environments, such as temperature sensors, cameras, sound sensors, and the like. Controllers control corresponding devices incorporated in the room, such as air conditioners, illuminating devices, humidity conditioners etc. More and more sensors and devices are expected to be incorporated in such a separate room to make it more comfortable and easier to control.

However, in conventional vehicles, sensors and controllers work independently. That is to say, users have to manually check meter readings of sensors, and then manually send instructions to corresponding controllers according to the meter readings, to operate corresponding devices accordingly. As a result, conventional vehicles have the following drawbacks: 1) It is dangerous that a driver operates a device incorporated in the vehicle when driving; 2) Usually, a user operates a device because he/she realizes that the environment is not comfortable. Since a conventional vehicle does not adjust the environment according to a user's requirements automatically, the user does not have the most comfortable experience; 3) If there are many devices to be operated, it may not be easy and/or convenient for every user to control.

Therefore, there is need to solve the above mentioned issues.

SUMMARY

In one embodiment of the present application, a universal control device for interfacing sensors and controllers incorporated in a relatively separate room is provided, which includes a control logic analyzer, a control center and a uniform interface. The control logic analyzer is adapted to receive a control logic, decompose the control logic into at least one condition and at least one instruction, and identify at least one sensor for the at least one condition and at least one controller for the at least one instruction correspondingly. The control center is adapted to retrieve data from corresponding sensors, and determine whether the at least one condition is met or not based on the retrieved data. When the at least one condition is met, the control center sends the at least one instruction to corresponding controllers for execution. The uniform interface is adapted to implement communications between the universal control device and the sensors and the controllers.

In some embodiments, the control logic analyzer is further adapted to check the decomposed conditions and the decomposed instructions stored in a database to determine whether there is any conflict.

In some embodiments, the control center is adapted to store the decomposed control logics in a database. Further, the control center may launch a task for one control logic stored in its database, wherein the task includes receiving data from corresponding sensors to monitor parameters corresponding to the decomposed conditions to determine whether the decomposed conditions are met or not, and sending the decomposed instructions to corresponding controllers for execution when the decomposed conditions are met. In some embodiments, when the control center is powered on, it may search its database for all control logics and may launch a task for every control logic. In some embodiments, when the control center is powered on, it may execute the tasks for the control logics stored in its database automatically. Therefore, a user only needs to input a control logic once, and the control center will store this control logic in its database, and will execute the control logic (monitoring sensors and operating controllers) every time when the control center is powered on. The control center is further adapted to obtain data from corresponding sensors via the uniform interface, and determine whether the conditions are met or not based on the obtained data. The data obtained from the sensors may be shared among all the tasks being performed by the control center. The control center is further adapted to send the instructions to the uniform interface when it determines that the conditions are met, and the uniform interface then operates the specific controllers based on the instructions from the control center.

The universal control device in the embodiment may further include a self-training device, which is adapted to figure out a user's favorite patterns according to the user's operations of the controllers and data retrieved from corresponding sensors when these operations are carried out. The self-training device is further adapted to program control logics according to these favorite patterns, and send the programmed control logics to the control logic analyzer for further processing. In some embodiments, when some controllers are operated by a user, the control center retrieves data from all sensors, and sends information about the user's operations and the retrieved data to the self-training device. Optionally, when a controller is operated by a user, the controller informs the control center of the user's operation via the uniform interface. Further, the self-training device may include a database, and store the information about users' operations and data from corresponding sensors in the database, and may figure out the users' favorite patterns based on the information stored in the database.

In some embodiments, the universal control device may be adapted to communicate with a human machine interface through which it receives control logics from users. In some embodiments, the human machine interface may be selected from a touch screen, a mobile phone, a microphone and, a personal digital assistant etc. The control logic analyzer is adapted to interface with the human machine interface.

In some embodiments, the uniform interface may be coupled to the sensors and controllers via a BUS.

In some embodiments, the universal control device may be incorporated in a head unit of a vehicle. And the sensors and controllers may be onboard components of the vehicle.

In another embodiment of the present application, a method for controlling sensors and controllers incorporated in a separate room is provided, the method including: receiving a control logic; decomposing the control logic into at least one condition and at least one instruction; obtaining data from at least one sensor associated with the at least one condition; and determining whether the at least one condition is met or not based on the obtained data, when the at least one condition is met, sending to at least one controller the at least one instruction for execution to carry out the control logic.

In some embodiments, the method further includes identifying the at least one sensor for the at least one condition and the at least one controller for the at least one instruction.

In some embodiments, the data are obtained from the at least one sensor through a uniform interface.

In some embodiments, the at least one instruction is sent to the at least one controller through the uniform interface.

The method may further include analyzing conditions and instructions stored in a database to check whether there is any conflict.

The method may further include figuring out users' favorite patterns according to the users' operations of the controllers and data obtained from the sensors when the operations are carried out, programming control logics corresponding to these favorite patterns, and then decomposing the programmed control logics for further processing.

Furthermore, the method may also include when the at least one of the controllers is operated by a user, retrieving data from corresponding sensors, storing information about the user's operations and the retrieved data in a database, and figuring out the user's favorite patterns based on the information stored in the database.

In some embodiments, the method may be performed by a head unit of a vehicle.

In some embodiments of the present application, a universal control device for interfacing/controlling a plurality of sensors and a plurality of controllers for controlling a plurality of devices, respectively, is provided. The plurality of sensors, the plurality of controllers, and the plurality of functional devices are incorporated in a vehicle. The universal control device is configured to: receive a control logic of operating a functional device when a parameter reaches a predetermined value; decompose the control logic into a sequence of sub-logics; identify devices from the plurality of sensors, the plurality of controllers, and the universal control device for the sub-logics, where the identified devices include at least one sensor for monitoring the parameter and at least one controller for controlling the functional device; translate the sequence of sub-logics into a sequence of machine executable instructions; and send the machine executable instructions to the identified devices correspondingly to carry out the control logic. The control logic and the sub-logics are in the form of a natural language. A sub-logic may be a part of the control logic. In some embodiments, a sub-logic is to be carried out by a single device identified for this sub-logic e.g. a controller. In some embodiments, a sub-logic is to be carried out by a plurality of devices identified for this sub-logic.

In some embodiments, the universal control device identifies from the plurality of sensors, the plurality of controllers, and the universal control device for the sub-logics according to previously defined corresponding relationship between keywords and the plurality of sensors, the plurality of controllers, and the universal control device.

In some embodiments, the universal control device translates the sub-logics into machine executable instructions according to previously defined corresponding relationship between keywords and machine instructions of the plurality of sensors, the plurality of controllers, and the universal control device. In some embodiments, the machine instructions are from instruction sets of the plurality of sensors, the plurality of controllers, and the universal control device.

In some embodiments, the plurality of sensors include at least one of: velocity meter, fuel meter, radar, camera, temperature sensor, and humidity sensor.

In some embodiments, the plurality of functional devices include at least one of: air-conditioner, power window, and seat heater.

In one embodiment of the present application, a method for carrying out a control logic of operating a functional device when a parameter reaches a predetermined value is provided. The method includes: receiving the control logic; decomposing the control logic into a sequence of sub-logics; identifying devices from a plurality of sensors, a plurality of controllers, and a universal control device for the sub-logics according to previously defined corresponding relationship between keywords and the plurality of sensors, the plurality of controllers, and the universal control device; translating the sequence of sub-logics into a sequence of machine executable instructions according to previously defined corresponding relationship between keywords and machine instructions of the plurality of sensors, the plurality of controllers, and the universal control device; and sending the machine executable instructions to the identified devices correspondingly for execution to carry out the control logic.

By means of the aforesaid features, the universal control device provided by the present application may make the relatively separate room more comfortable and easier to control.

BRIEF DESCRIPTION OF THE DRAWINGS

The preferable embodiments of the application will be described in detail in the context below with reference to the following drawings.

DETAILED DESCRIPTION

Hereinafter, the embodiments of the invention will be described in detail with reference to the drawings. It is appreciated that the present application is not limited to the specific embodiments described herein.

Figure 1:
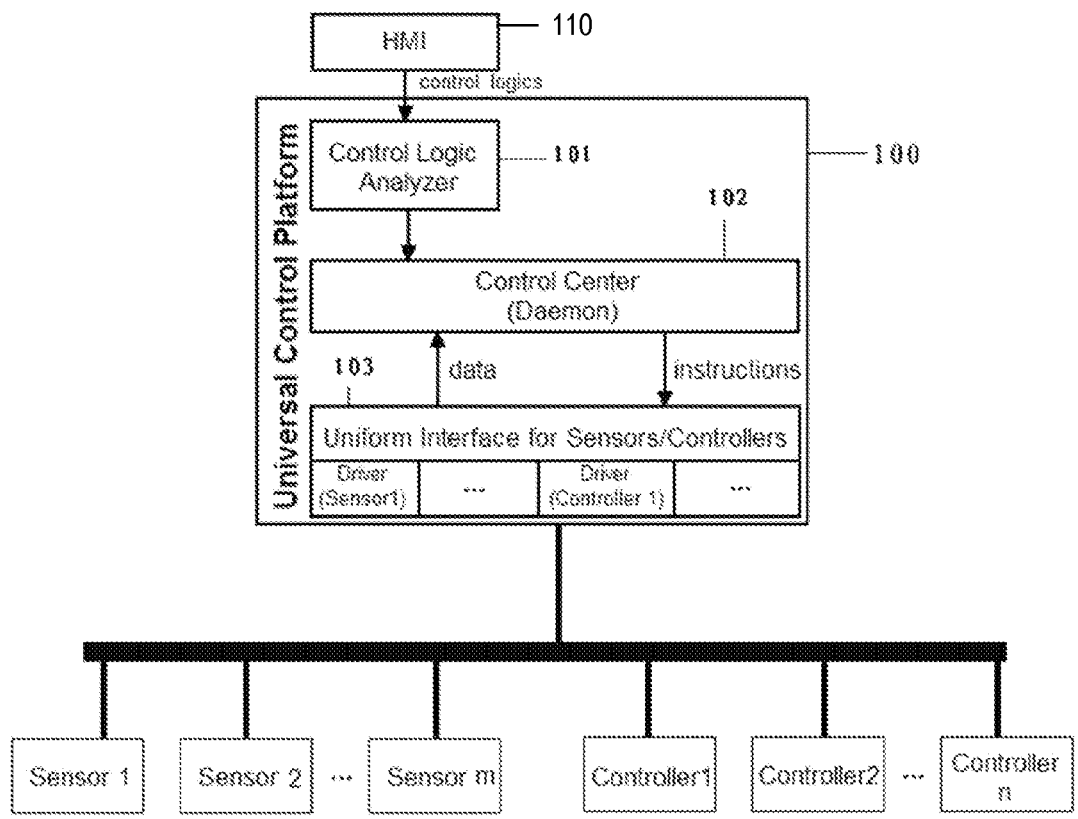
FIG. 1 illustrates a schematic block diagram of a universal control device according to one embodiment of the present application.

FIG. 1 shows a universal control device 100 according to one embodiment, which includes a control logic analyzer 101, a control center 102 and a uniform interface 103. Users in a relatively separate room may communicate with the universal control device 100 through a human machine interface (HMI) 110. HMI 110 communicates with the control logic analyzer 101 of the universal control device 100.

The control logic analyzer 101 may be configured to provide a user interface (UI) for the universal control device 100. It may receive control logics input by users through various HMI, and decompose the control logics into conditions and instructions. The control logic analyzer 101 may decompose the control logics into conditions and instructions, identify corresponding sensors for monitoring parameters associated with the conditions, and identify corresponding controllers for conducting the instructions. The control logic analyzer 101 may also forward the decomposed conditions and instructions to the control center 102. The control logics may be in form of a natural language. By way of example, one exemplary control logic may be "turn the air-conditioner on and adjust the temperature to 25° C. if too hot or too cold 5 minutes before 6:00 pm". If this control logic is received by the control logic analyzer 101, it may decompose the control logic to conditions and instructions, and identify corresponding devices, such as "condition 1, monitoring timer to determine whether time reaches 5:55 pm", "condition 2, monitoring a temperature sensor to determine whether the temperature in the room is above 28° C. or is below 20° C.", and "instruction—operating the controller of the air conditioner, particularly, turning on the air conditioner and setting it to 25° C.".

The control center 102 may be a daemon working in background. It may be configured to get the decomposed conditions and instructions from the control logic analyzer 101. And then, the control center 102 may monitor corresponding sensors via the uniform interface 103 to determine whether the conditions are met or not. If the control center 102 determines the conditions are met, it triggers corresponding operations. In other words, the control center 102 instructs corresponding controllers to perform the decomposed instructions via the uniform interface 103. Alternatively, the control center 102 may store the decomposed control logics in its database, and launch a task for every piece of control logic stored in its database, wherein the task includes monitoring the sensors involved in the corresponding control logic to determine whether the decomposed conditions are met or not, and operating the corresponding controllers when said conditions are met. When the control center is powered on, it searches its database for all control logics and launches a task for every piece of control logic. Further, after the control center is powered on, it will execute the control logics stored in its database automatically. Therefore, a user only needs to input control logics once, and these control logics (monitoring sensors and operating controllers) may be executed every time the control center is powered on. Further, the control center 102 obtains data from the sensors through the uniform interface 103, and the obtained data may be shared among all the tasks being performed by the control center 102. For example, both of two tasks need to monitor the environment temperature, one needs to read the temperature sensor every 10 seconds, and the other only needs to read it every 1 minute. The control center 102 needs to read the sensor per 10 seconds, and the readings will be shared by the two tasks.

The uniform interface 103 may be coupled with the sensors and/or controllers via a BUS. The uniform interface 103 is an interface between the control center 102 and the sensors, and the controllers. The uniform interface 103 may be configured to collect data from sensors and controllers, and forward the data to the control center 102. The uniform interface 103 is further connected to a device such as a timer, a clock, and the likes, so as to collect data about time from the device and forward the data to the control center. The collected data of the uniform interface 103 may include sensor/controller types, sensor data meanings, sensing ranges, supported operations and ranges of controllers, real-time environment parameters from sensor, operation feedbacks from controllers, manual operations of users which indicate their usage patterns, etc. The uniform interface 103 may also send instructions to be executed to the sensors and controllers. Preferably, drivers of the sensors and controllers are integrated in the uniform interface 103 to drive them to work.

Preferably, the universal control device supports various HMI, such as touch screen, microphone, and other user devices such as cell phones, tablet PCs, PDA, etc. Users can access the UI of the universal control device by these devices to program control logics. The HMI may connect to the universal control device via wireless or wired connection.

Figure 2:
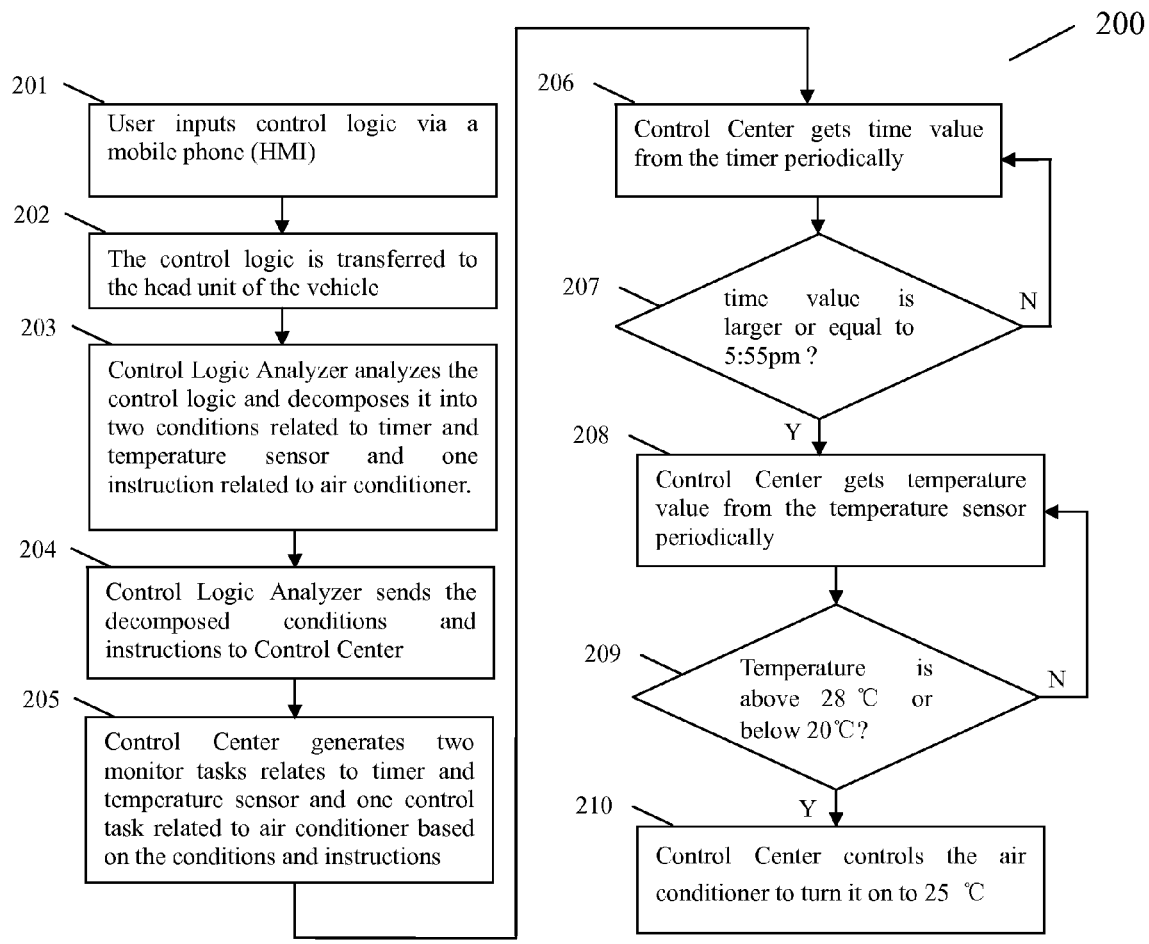
FIG. 2 illustrates a schematic flowchart of an example operation procedure of the universal control device shown in FIG. 1.

With reference to FIG. 2, an example operation of the universal control device shown in FIG. 1 will be described. This description is only for purpose of illustration, and should not be interpreted as a limitation.

In this embodiment, the universal control device is incorporated in a vehicle, more particularly in a head-unit of the vehicle to interface sensors such as velocity and fuel meters, radar, camera, temperature sensor, humidity sensor etc., and controllers such as air-conditioner controller, power window controller, seat heater controller etc.

In the example as shown in FIG. 2, a user wants his car to get prepared before he goes off work every day. He may program a control logic as "turn the air conditioner on and set it to 25° C. if too hot or too cold 5 minutes before my leaving (e.g., 6:00 pm)". The control device collects real-time data from the temperature sensor continuously. If the environment temperature is above 28° C. or below 20° C., the control center will send an instruction of turning on the air-conditioner to the controller of the air-conditioner at 5:55 pm. If the environment temperature is right around 25° C., it will not do anything.

As shown in FIG. 2, the example operation is generally indicated as 200. In the operation 200, the user input a control logic using a cell phone (HMI) in 201. The control logic may be, for example, "5:55 pm, if the temperature is above 28° C. or below 20° C., turn on the onboard air-conditioner and set it to 25° C.". The control logic will be sent to the head-unit of the vehicle through wireless network in 202.

In 203, the control logic analyzer 101 receives the control logic, decomposes it into conditions and instructions, and identifies corresponding sensors and controllers The decomposed control logic includes: 1. the first condition, which is monitoring timer to determine whether it reaches 5:55 pm; 2. the second condition, which is monitoring the temperature sensor to determine whether the temperature is above 28° C. or below 20° C.; and 3. an instruction, which is operating the controller of the air conditioner, i.e., turning the air conditioner on and set it to 25° C.

In 204, the control logic analyzer 101 sends the two decomposed conditions and one instruction to the control center 102. In 205, the control center 102 then generates corresponding monitor and/or control tasks based on the decomposed conditions and instructions from the control logic analyzer 101. The monitor and control tasks include: 1. periodically obtaining a time value from the timer to determine whether the time value reaches 5:55 pm; 2. If the condition 1 is met, then obtaining a temperature value from the temperature sensor to determine whether the temperature is above 28° C. or below 20° C.; and 3. If the condition 2 is met, turning the air-conditioner on and set it to 25° C.

Then the control center 102 performs the generated tasks. Specifically, in 206, the control center 102 reads the time value from the timer via the uniform interface 103 periodically, and determines whether the time reaches 5:55 pm in 207. If it is determined that the time does not reach 5:55 pm, then the procedure returns to 206. If the control center 102 determines that the time reaches 5:55 pm, then the control center 102 reads temperature value from the temperature sensor via the uniform interface 103 periodically in 208, and determines whether the temperature is above 28° C. or below 20° C. in 209. If the result of 209 is negative, then the control center 102 will repeat the monitoring task in 208. Otherwise, if the result of 209 is positive, then the control center 102 will send the instruction to the air conditioner via the uniform interface 103, to turn the air-conditioner on and set it to 25° C. in 210.

It can be seen from the aforesaid embodiment that the universal control device according to the present application allows users in the relatively separate room to operate sensors and controllers incorporated in the room through HMI. Furthermore, the universal control device according to the present application may coordinate the operations of various sensors and controllers.

Figure 3:
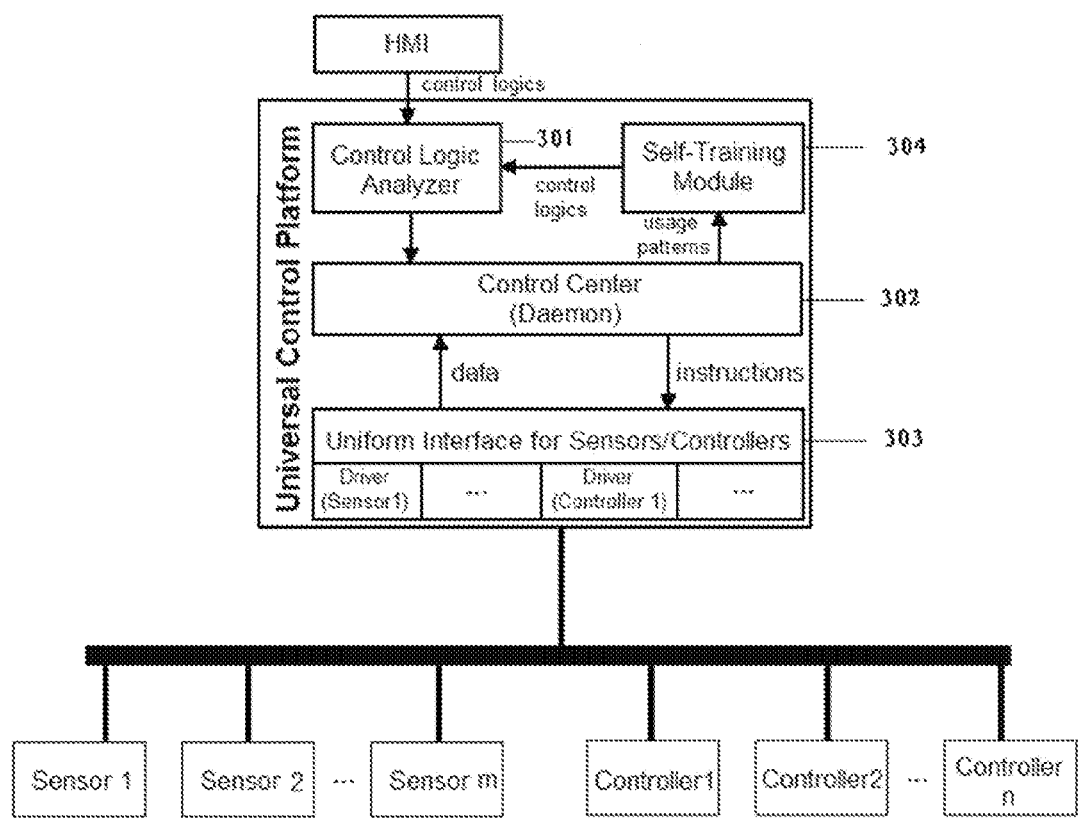
FIG. 3 illustrates a schematic block diagram of a universal control device according to another embodiment of the present application.

FIG. 3 illustrates a schematic block diagram of a universal control device according to another embodiment of the present application. As shown in FIG. 3, the universal control device may further include a self-training device 304. The self-training device 304 receives data which is forwarded from the control center 302 which data includes users' manual operations and corresponding sensors' measurements when the operations are carried out. The self-training device 304 may figure out the users' favorite patterns by self-training, program control logics according to these patterns, and send the control logics to the control logic analyzer 301 for further processing. Further, the self-training device 304 may include a database to store the received data.

Whenever a driver operates certain devices (such as a power window) manually, the control center 302 starts a data collection procedure as soon as it detects the operation. In some embodiments, the control center 302 reads measuring data from all the onboard sensors, and composes a snapshot of the moment when the operation is conducted. This snapshot will be sent to the database of the self-training device 304 for storage. When such snapshots of a specific operation are accumulated to a certain number, the self-training device 304 can figure out the users' favorite pattern of the operation e.g. the driver likes to open the power window when the outside temperature is between 15~25° C. and the velocity is below 45 km/h. The self training device 304 then program a control logic according to this pattern, and sends it to the control center 302.

Therefore, the universal control device can have intelligence of self training, and is able to actively provide users' favorite service, which makes the relatively separate room more intelligent.

Figure 4:
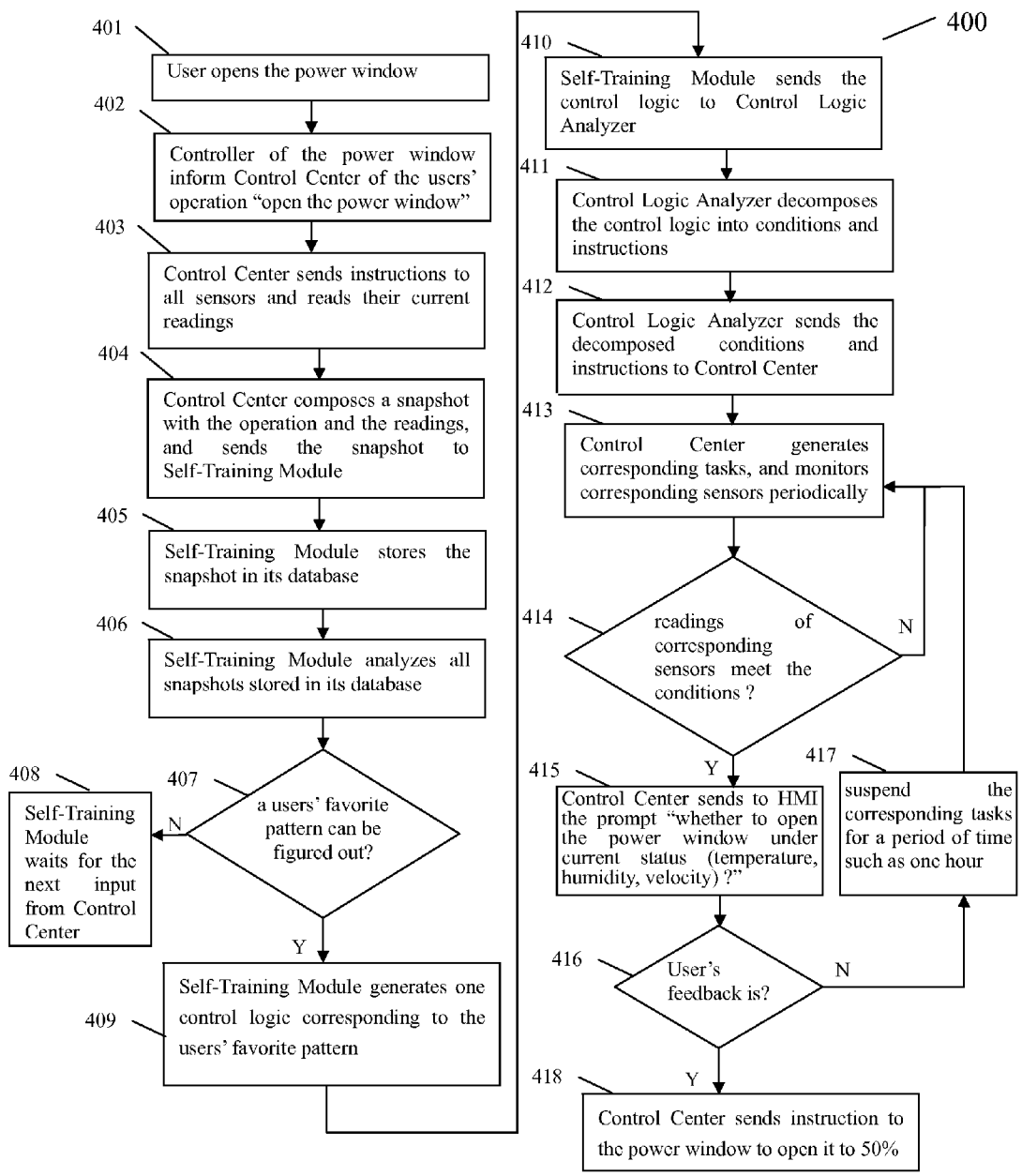
FIG. 4 illustrates a schematic flowchart of an example operation procedure of the universal control device shown in FIG. 3.

With reference to FIG. 4, an exemplary operation of the universal control device will be described, in which the universal control device learns the users' favorite patterns according to the user's manual operations, and provides intelligence services corresponding to the favorite patterns.

In the example as shown in FIG. 4, the driver always opens the power window of the vehicle when the atmosphere temperature/humidity are in certain ranges, the air is fresh, and the velocity of the car is below 45 km/h. This pattern will be learned by the self-training device and a corresponding piece of control logic will be generated and performed. The universal control device keeps retrieving real-time data from temperature, humidity, air pollution and velocity sensors. If the conditions are met, the universal control device will open the power window for the driver automatically.

As shown in FIG. 4, the example operation is generally indicated as 400. In the operation 400, the driver opens a power window in 401. In 402, the power window then sends a message to the control center 302 via the uniform interface 303 to inform the control center 302 of the users' operation which is "a user opens a power window" in this example.

Upon receiving the message, the control center 302 sends instructions to all sensors and reads their current readings in 403. The control center 302 then composes a snapshot of the moment which including the driver's operation and the readings of all sensors, and sends this snapshot to the self-training device 304 in 404.

The self-training device stores the received snapshot which includes a user's operation and the readings of the sensors in its database in 405. The self-training device 304 then analyzes corresponding snapshots stored in the database in 406, and determines whether a user's favorite pattern can be figured out based on the snapshots in 407. If the self-training device 304 determines that a user's favorite pattern cannot be figured out, then the self-training device 304 will wait for the next input from the control center 302 in 408. Otherwise, if the self-training device 304 determines that a user's favorite pattern can be figured out, then in 409, the self-training device 304 figures out the user's favorite pattern, and generates a control logic corresponding to the user's favorite pattern, which in this example is "open the power window to 50% when the temperature is in a range from 20° C. to 28° C., the humidity is in a range of 40~70%, the pollution index is lower than X and the velocity is slower than 45 km/h". The self-training device 304 then sends this control logic to the control logic analyzer 301 in 410.

In 411, the control logic analyzer 301 analyzes this control logic, and decomposes this control logic into conditions and instructions. In 412, the control logic analyzer 301 sends these decomposed conditions and instructions to the control center 302.

In 413, the control center 302 generates corresponding monitor and/or control tasks based on the decomposed conditions and instructions from the control logic analyzer 301, and periodically monitors corresponding sensors. In 414, the control center 302 determines whether the readings from the corresponding sensors met the decomposed conditions. If the result of 414 is negative, then the control center 302 will repeat the monitoring tasks in 413. Otherwise, if the result of 414 is positive, then in 415 the control center 302 sends one prompt which in this example includes the current situation (temperature, humidity, pollution index and velocity) and a suggestion (whether the power window should be open or not ?) to the HMI via the control logic analyzer 301.

In 416, the control center 302 receives the feedback from the user, and determines whether the feedback is yes or no. If the feedback from the user is no, then the control center 302 will suspend the corresponding monitor tasks for a period of time such as one hour in 417. After this period time, the control center 302 will continue the monitor tasks in 413. Otherwise, if the feedback from the user is yes, then in 418, the controller sends commands to corresponding controllers to perform the corresponding control task which in this example is opening the power window to 50%.

Although in the above mentioned embodiments, the universal control device is utilized in a vehicle, the universal control device according to the present application is not limited in a vehicle, it can be used in different relatively separate rooms, such as an office building, a cinema and the like, to interface sensors and controllers in the separate room. By way of example, the universal control device of the present application can be used in an office building to interface air conditioning systems, illumination systems, cameras and power supplies incorporated in this office building. Then a user is able to control all the systems via a single HMI connected to the universal control device.

In some embodiments, the user may edit a control logic, such as "After 8:00 pm, if there is nobody in the office, then turn off all lights and air conditioners" through a HMI connected to the universal control device. Then the universal control device will control all corresponding sensors such as camera and timer, and corresponding controllers such as switches of the illumination system and the air conditioners, to perform the edited control logic. By this way, the universal control device may facilitate the control of various devices in the office room, and may also provide intelligent services to the users.

Many variations and other aspects of the present application will be apparent to those skilled in the art based on the inspiration of the present application. Thus, it should be understood by those skilled in the art that the present application is not limited by the above described embodiments, and all the equivalents and modifications not going beyond the spirit of the present application should be included in the scope of the claims.

The invention claimed is:

1. A universal control device for controlling sensors and controllers incorporated in a separate room, comprising:
 a control logic analyzer communicatively coupled to a user interface device to receive, from the user interface device, a control logic, decompose the control logic into at least one condition and at least one instruction, and identify at least one sensor for the at least one condition and at least one controller for the at least one instruction correspondingly;
 a uniform interface communicatively coupling the at least one sensor and the at least one controller to the universal control device;
 a control center communicatively coupled to the uniform interface to retrieve data from the at least one identified sensor via the uniform interface, determine whether the at least one condition is met or not based on the retrieved data, and send the at least one instruction to the at least one identified controller, via the uniform interface, for execution when the at least one condition is met; and
 a self-training device communicatively coupled to the control logic analyzer and the control center, the self-training device receiving data from the control center indicating manual operations of one or more users and corresponding measurements of the at least one sensor when the manual operations are performed, determining favorite patterns of the one or more users based on the received data, programming control logics according to the favorite patterns, and sending the programmed control logics to the control logic analyzer for further processing.

2. The universal control device according to claim 1, wherein the control center comprises a storage device to store decomposed control logics.

3. The universal control device according to claim 2, wherein the control center searches and processes decomposed control logics stored in the storage device when the control center is powered on.

4. The universal control device according to claim 3, wherein the retrieved data from the at least one sensor is shared among tasks being performed by the control center.

5. The universal control device according to claim 2, wherein the control logic analyzer analyzes conditions and instructions stored in the storage device and checks whether there is any conflict between the decomposed control logics stored in the storage device.

6. The universal control device according to claim 1, wherein the control center starts a data collection procedure as soon as a manual operation of a vehicle device is detected, the data collection procedure including collecting the corresponding measurements of the at least one sensor when the manual operations are performed and composing a snapshot of a moment when each of the manual operations are performed.

7. The universal control device according to claim 6, wherein the universal control device is incorporated in a head unit of a vehicle, where the sensors and the controllers are incorporated in the vehicle, and wherein the self-training device comprises a database, the self-training device receiving and storing the snapshots from the control center in the database and determining the favorite pattern of the one or more users when snapshots of a specific manual operation are accumulated to a threshold number.

8. The universal control device according to claim 7, wherein the sensors comprise at least one of a velocity meter, a fuel meter, a radar, a camera, a temperature sensor, and a humidity sensor.

9. The universal control device according to claim 7, wherein the controllers control at least one of an air-conditioner, a power window, and a seat heater incorporated in the vehicle.

10. A method for controlling sensors and controllers which control corresponding functional devices, where the sensors, the controllers, and the functional devices are incorporated in a vehicle, the method comprising:
 receiving a control logic in a form of a natural language input from a user interface device;
 decomposing the control logic into at least one condition and at least one instruction;
 identifying at least one sensor for the at least one condition correspondingly;
 identifying at least one controller for the at least one condition correspondingly;
 monitoring the at least one sensor to determine whether the at least one condition is met or not;
 sending the at least one instruction to the at least one identified controller correspondingly for execution to carry out the control logic.

11. The method according to claim 10, wherein the sensors comprise at least one of a velocity meter, a fuel a meter, a radar, a camera, a temperature sensor, and a humidity sensor.

12. The method according to claim 10, wherein the functional devices comprise at least one of an air-conditioner, a power window, and a seat heater.

13. A universal control device for controlling a plurality of sensors and a plurality of controllers which control a plurality of devices, respectively, the universal control device configured to:
- receive, at a self-training device, data including manual operations of a user and corresponding measurements of one or more of the plurality of sensors when the manual operations are carried out;
- determine a favorite pattern of the user based on the received data;
- program a trained control logic according to the favorite pattern;
- receive, at a control logic analyzer, a control logic of operating a functional device of the plurality of devices when a parameter reaches a predetermined value, the control logic comprising one or more of the trained control logic and an input control logic from a user interface device;
- decompose, with the control logic analyzer, the control logic into a sequence of sub-logics;
- identify, with the control logic analyzer, devices from the plurality of sensors, the plurality of controllers, and the universal control device for the sub-logics, where the identified devices include at least one sensor for monitoring the parameter and at least one controller for controlling the functional device;
- translate, with the control logic analyzer, the sequence of sub-logics into a sequence of machine executable instructions; and
- send, via a uniform interface, the machine executable instructions to the identified devices correspondingly to carry out the control logic;
- where the plurality of sensors, the plurality of controllers, and the plurality of devices are incorporated in a vehicle.

14. The universal control device according to claim 13, wherein the universal control device identifies, from the plurality of sensors, the plurality of controllers, and the universal control device, one or more of the plurality of devices for the sub-logics according to a previously defined corresponding relationship between keywords and the plurality of sensors, the plurality of controllers, and the universal control device.

15. The universal control device according to claim 13, wherein the universal control device translates the sub-logics into machine executable instructions according to a previously defined corresponding relationship between keywords and machine instructions of the plurality of sensors, the plurality of controllers, and the universal control device.

16. The universal control device according to claim 13, where the plurality of sensors comprise at least one of: a velocity meter, a fuel meter, a radar, a camera, a temperature sensor, and a humidity sensor.

17. The universal control device according to claim 13, where the plurality of devices comprise at least one of: an air-conditioner, a power window, and a seat heater.

18. The universal control device according to claim 13, where the control logic and the sub-logics are in the form of a natural language.

19. A method for carrying out a control logic of operating a functional device when a parameter reaches a predetermined value, comprising:
- receive, at a self-training device, data including manual operations of a user and corresponding measurements of one or more of the plurality of sensors when the manual operations are carried out;
- determine a favorite pattern of the user based on the received data;
- program a trained control logic according to the favorite pattern;
- receiving, at a control logic analyzer, the control logic, the control logic comprising one or more of the trained control logic and an input control logic from a user interface device;
- decomposing, with the control logic analyzer, the control logic into a sequence of sub-logics;
- identifying, with the control logic analyzer, devices from a plurality of sensors, a plurality of controllers for controlling a plurality of functional devices correspondingly, and a universal control device for the sub-logics correspondingly according to a previously defined corresponding relationship between keywords and the plurality of sensors, the plurality of controllers, and the universal control device;
- translating, with the control logic analyzer, the sequence of sub-logics into a sequence of machine executable instructions according to a previously defined corresponding relationship between keywords and machine instructions of the plurality of sensors, the plurality of controllers, and the universal control device; and
- sending, via a uniform interface, the machine executable instructions to the identified devices correspondingly for execution to carry out the control logic,
- where the plurality of sensors, the plurality of controllers, the plurality of functional devices, and the universal control device are incorporated in a vehicle.

20. The method according to claim 19, wherein the plurality of sensors comprise at least one of: a velocity meter, a fuel meter, a radar, a camera, a temperature sensor, and a humidity sensor and wherein the plurality of functional devices comprise at least one of an air-conditioner, a power window, and a seat heater.

* * * * *